United States Patent
Suzuki et al.

(10) Patent No.: US 6,744,990 B1
(45) Date of Patent: Jun. 1, 2004

(54) WDM OPTICAL TRANSMISSION SYSTEM AND AN OPTICAL TRANSMISSION LINE THEREOF

(75) Inventors: Masatoshi Suzuki, Kamifukuoka (JP); Noriyuki Takeda, Kamifukuoka (JP); Noboru Edagawa, Kamifukuoka (JP); Hideaki Tanaka, Kamifukuoka (JP); Shinichi Nakagawa, Tokyo (JP); Hidenori Taga, Tokyo (JP); Koji Goto, Tokyo (JP)

(73) Assignees: KDD Corporation, Tokyo (JP); KDD Submarine Cable Systems Inc., Tokyo (JP)

( * ) Notice: Subject to any disclaimer, the term of this patent is extended or adjusted under 35 U.S.C. 154(b) by 0 days.

(21) Appl. No.: 09/434,679

(22) Filed: Nov. 5, 1999

(30) Foreign Application Priority Data

Nov. 6, 1998 (JP) ............................................. 10-316472

(51) Int. Cl.⁷ .......................... H04B 10/12; H04B 10/00
(52) U.S. Cl. ........................ 398/147; 398/148; 398/158
(58) Field of Search .............................. 359/124, 127, 359/132, 180, 187, 188; 398/13, 14, 34, 68, 73, 142, 147, 148, 158

(56) References Cited

U.S. PATENT DOCUMENTS

| | | | | |
|---|---|---|---|---|
| 5,532,868 A | * | 7/1996 | Gnauck et al. | 359/332 |
| 5,875,045 A | * | 2/1999 | Sugiyama et al. | 359/124 |
| 5,900,959 A | * | 5/1999 | Noda et al. | 359/180 |
| 6,005,702 A | * | 12/1999 | Suzuki et al. | 359/124 |
| 6,055,081 A | * | 4/2000 | Koyano et al. | 359/130 |
| 6,252,687 B1 | * | 6/2001 | Ishikawa et al. | 359/124 |
| 6,271,806 B1 | * | 8/2001 | Motoshima et al. | 345/418 |
| 6,366,376 B1 | * | 4/2002 | Miyata et al. | 359/124 |

OTHER PUBLICATIONS

M. Suzuki et al., "170 Gb/s transmission over 10850 km using Large Core Transmission Fiber", Postdeadline Paper, PD17, Optical Fiber Communication Conference, San Jose, U.S.A., Feb. 1998.

* cited by examiner

Primary Examiner—Leslie Pascal
Assistant Examiner—Dzung Tran
(74) Attorney, Agent, or Firm—Christie, Parker & Hale, LLP

(57) ABSTRACT

An object of the present invention is to realize almost the same transmission characteristic in all wavelengths at a transmission rate of 10 Gb/s or more. An optical transmitter 10 outputs WDM signal light multiplexed with signal light of a plurality of wavelengths toward an optical transmission line 12. The optical transmission line 12 comprises an optical transmission fiber 14, an optical repeating amplifier 16 and a dispersion compensating fiber 18. The gain characteristic of the optical repeating amplifier 16 is set so that the gain becomes the maximum at the effective zero dispersion wavelength of the optical transmission line 12 and that lowers inversely proportional to the distance from the effective zero dispersion wavelength. The whole optical transmission line 12 is set so that the peak power deviation between the effective zero dispersion wavelength $\lambda 0$ and the wavelength $\lambda 1$ or $\lambda n$ on both end becomes approximately 4 dB.

13 Claims, 14 Drawing Sheets

WDM OPTICAL TRANSMISSION SYSTEM AND AN OPTICAL TRANSMISSION LINE THEREOF

FIELD OF THE INVENTION

This invention relates to a WDM optical transmission system and an optical transmission line thereof.

BACKGROUND OF THE INVENTION

Deterioration of transmission characteristics in an optical amplification repeating transmission system is mainly caused by waveform deterioration due to the synergistic effect of the chromatic dispersion characteristic and non-linear optical effect of an optical fiber which is a transmission medium.

An effective method for preventing the waveform deterioration owing to the chromatic dispersion characteristic is to periodically insert dispersion-compensating mediums having inverse chromatic dispersion to that of the optical transmission fiber at specific intervals. By using the above method, it is possible to keep the absolute value of accumulated chromatic dispersion under a specific level. Also, the nonlinear effect of the optical fiber can be reduced by enlarging the effective cross section of transmission fiber.

A wavelength division multiplexing (WDM) transmission system has attracted a great deal of public expectations as a means suitable for a higher-capacity transmission system. In the WDM transmission, a compensation dispersion value of a dispersion-compensating medium is generally set so as to compensate for the accumulated chromatic dispersion of a center signal with in a signal wavelength band. The wavelength in which compensation of its accumulated chromatic dispersion is optimized by the chromatic dispersion medium is to be called hereinafter an effective zero dispersion wavelength or a zero dispersion wavelength of the transmission system. In optical transmission systems in which the dispersion-compensating mediums are not inserted, the zero dispersion wavelength of the optical transmission fiber is identical to the effective zero dispersion wavelength.

When the WDM transmission is utilized in an optically amplified repeater transmission system, the amplification characteristic of a repeater amplifier is generally adjusted so as to flatten out limitlessly within a signal wavelength band. When optical power of each signal wavelength is set to be the same, S/N ratio and non-linear effect also become equivalent and, therefore, it has been considered easy to obtain the same transmission characteristic.

An example that improved transmission characteristics using the above-mentioned dispersion compensation and enlargement of effective cross section is described by Masatoshi SUZUKI et al in "170 Gb/s transmission over 10850 km using Large Core Transmission Fiber", Postdeadline Paper, PD17, Optical Fiber Communication Conference, San Jose, U.S.A., February 1998.

Described in the reference are two kinds of test results of 10850 km transmission experiment, one is a transmission of thirty-two 5.3 Gb/s multiplexed wavelengths and the other is that of sixteen 10.6 Gb/s multiplexed wavelengths. The test results are shown in FIG. 19. The horizontal axis, the left vertical axis and the right vertical axis respectively represents wavelength, $Q^2$ value and bit error rate (BER) corresponding to the $Q^2$ value. Almost the same transmission characteristic is obtained at all wavelengths in the 5.3 Gb/s wavelength multiplexing transmission test, on the other hand, in the 10.6 Gb/s transmission, the transmission characteristic of the signal wavelengths apart from the effective zero dispersion wavelength deteriorates inversely proportional to the wavelength difference. This is because the accumulated chromatic dispersion of the wavelengths apart from the effective zero dispersion wavelength becomes excessive due to the influence of the dispersion slope of the optical fiber and in addition the nonlinear optical effect took part in causing the irreversible waveform deterioration.

As explained above, in the conventional WDM optical transmission systems, when the transmission rate becomes 10 Gb/s or more, it was difficult to obtain desired satisfactory transmission characteristics of the wavelengths having the large accumulated chromatic dispersion owing to the synergistic effect of the accumulated chromatic dispersion and nonlinear effect.

SUMMARY OF THE INVENTION

An object of the present invention is to provide a WDM optical transmission system and optical transmission line capable of realizing almost the same transmission characteristic in all wavelengths even at the transmission rate of 10 Gb/s or more.

In the invention, the power of wavelength-division-multiplexed and transmitted signal light of a plurality of wavelengths is set to reduce proportional to the wavelength difference of each signal from its effective zero dispersion wavelength on an optical transmission line. Accordingly, the nonlinear effect of the wavelengths having large chromatic dispersion becomes small. As a result, the synergistic effect of the chromatic dispersion and nonlinear effect becomes equivalent in the whole signal light and therefore satisfactory transmission characteristics can be realized in the whole signal light.

Also, the transmission characteristic of the optical transmission line is set so that the transmissibility of the wavelengths reduces proportional to the difference in wavelength from the effective zero dispersion wavelength of the optical transmission line. By controlling the power deviation of the signal light within a predetermined value, for instance several dB, the bad influence due to the low S/N ratio can be neglected. To realize the above configuration, it is required to dispose an optical amplifier having a gain characteristic corresponding to the transmission characteristic and/or a transmission characteristic adjuster corresponding to the transmission characteristic.

An optical transmitter can take either way of outputting each optical signal toward the optical transmission line at the same power or outputting a plurality of optical signals toward the optical transmission line in a convex-shape power spectrum distribution in which the power of the signal light reduces proportional to the difference in wavelength from the effective zero dispersion wavelength of the optical transmission line. Further, the optical transmitter, at the beginning, can output the signal light toward the optical transmission line in a concave-shaped power spectrum distribution in which the power of the signal light increases directly proportional to the difference in wavelength from the effective zero dispersion wavelength of the optical transmission line. In that case, the power deviation should be controlled within the level in which the power spectrum distribution of the signal lights changes from the convex-shaped to the at an early stage on the optical transmission line and the signal light propagates in the convex-shaped power spectrum distribution on most of the optical transmission line.

It is preferable that the optical transmitter comprises a control light generator for generating gain-shape control light having the wavelengths except for the ones in the wavelength band of the signal light and the gain-shape control light is selectively multiplexed with the signal light to be output toward the optical transmission line. Owing to the gain-shape control light, the transmission characteristic of the optical transmission line becomes controllable and also it becomes easy to deal with a variety of characteristics and variations with time of respective optical components. Therefore, the satisfactory transmission characteristic can be maintained for a long time.

DESCRIPTION OF THE PREFERRED EMBODIMENTS

Embodiments of the present invention are explained below in detail with reference to the drawings.

Figure 1:
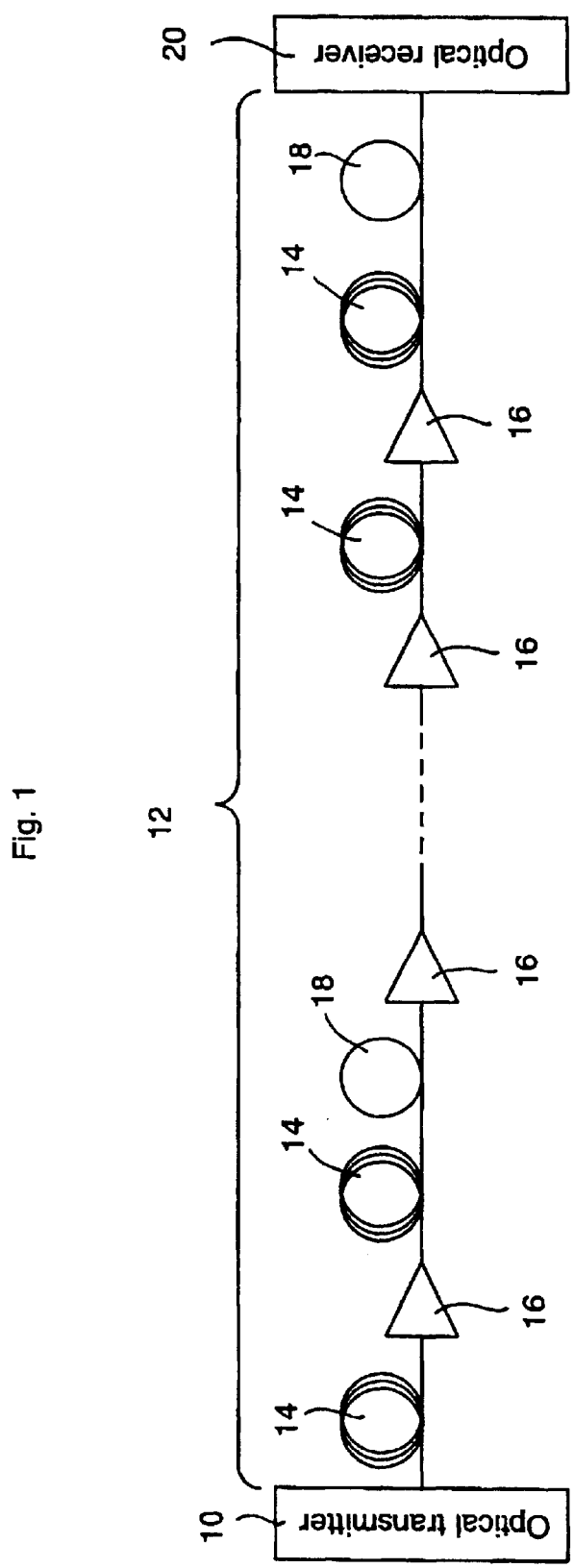
FIG. 1 is a schematic block diagram according to the first embodiment of the present invention.

FIG. 1 shows a schematic block diagram of the first embodiment of the invention. An optical transmitter 10 outputs WDM signal light, in which optical signals having a plurality of wavelengths (e.g. sixteen or thirty-two wavelengths) are multiplexed, toward an optical transmission line 12. The optical transmission line 12 comprises a dispersion compensating amplification repeating optical transmission line consists of an optical transmission fiber 14, optical repeater amplifiers 16 and dispersion compensating fibers 18. The signal light from the optical transmitter 10 is optically amplified by the optical repeater amplifiers 16 disposed at appropriate intervals and compensated their accumulated chromatic dispersion by the dispersion compensating fibers 18 also disposed at appropriate intervals while propagating on the optical transmission fiber 14. The signal light propagated on the optical transmission line 12 finally arrives at an optical receiver 20 and gets a receiving process.

Figure 2:
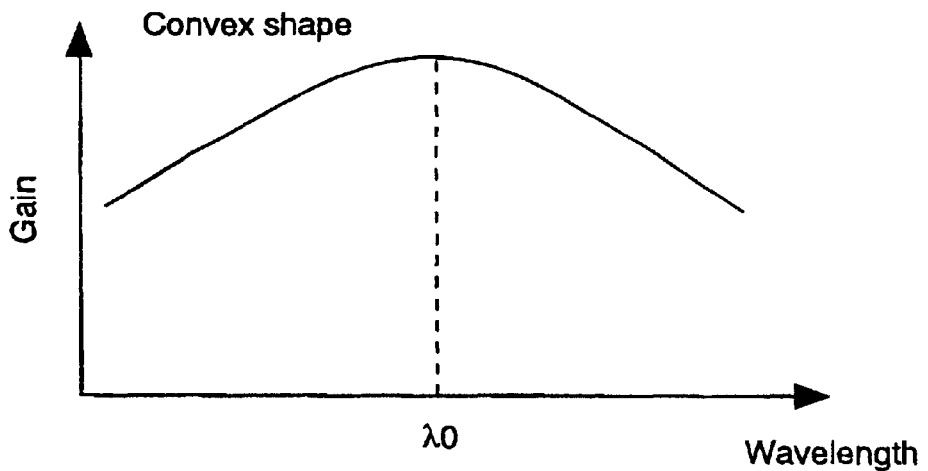
FIG. 2 is a diagram showing a gain distribution of an optical repeater amplifier 16.

In the embodiment, the gain characteristic of the optical repeater amplifier 16 is set so that its gain becomes maximum at the effective zero dispersion wavelength of the optical transmission line 12 and reduces as separating away from the effective zero dispersion wavelength. FIG. 2 shows a diagram of a gain characteristic of the optical repeater amplifier 16. The effective zero dispersion wavelength of the WDM optical transmission line 12 is expressed as $\lambda 0$, the shortest wavelength in the WDM transmission is expressed as $\lambda 1$ and the longest wavelength of the WDM transmission is expressed as $\lambda n$ respectively. The horizontal axis and the vertical axis represent wavelength and gain respectively. The difference between the maximum gain (the gain at the zero dispersion wavelength $\lambda 0$) and the minimum gain (the gain on both ends, the wavelength $\lambda 0$ or $\lambda n$) is, although the details will be explained later, approximately 1 dB or so per 900 km.

In an optical transmission system in which the effective zero dispersion wavelength is deviated from a signal wavelength band, its gain shape does not become convex and inclines to one side. In the meantime, a method has been attracting much attention in which a signal wavelength band is divided into a plurality of bands and each band receives the same process (such as the optical amplification and dispersion compensation). In this method, for instance, it is possible to divide a signal wavelength band into two bands, one belongs to the wavelengths longer than the effective zero dispersion wavelength $\lambda 0$ and the other belongs to the wavelengths shorter than the effective zero dispersion wavelength $\lambda 0$, and the two bands are optically amplified per band. In this case, the gain shape inclines from a wavelength on one band end to a wavelength on the other band end in each band and therefore it does not describe a convex line. When a plurality of bands are dispersion-compensated in the center of each band, the gain shape of each band describes a convex line.

It is difficult to provide the convex-shaped gain characteristic in which the gain becomes the maximum at the effective zero dispersion wavelength as shown in FIG. 2 by employing only an optical amplifier with an existing erbium doped optical amplification fiber. It is, however, easy to obtain a desired transmission characteristic using an optical filter such as dielectric multilayer or etalon. Accordingly, the combination of, for example, an optical amplifier and an optical filter, makes it easy to obtain the convex-shaped gain characteristic in which its gain becomes the maximum at the effective zero dispersion wavelength as shown in FIG. 2.

Figure 3:
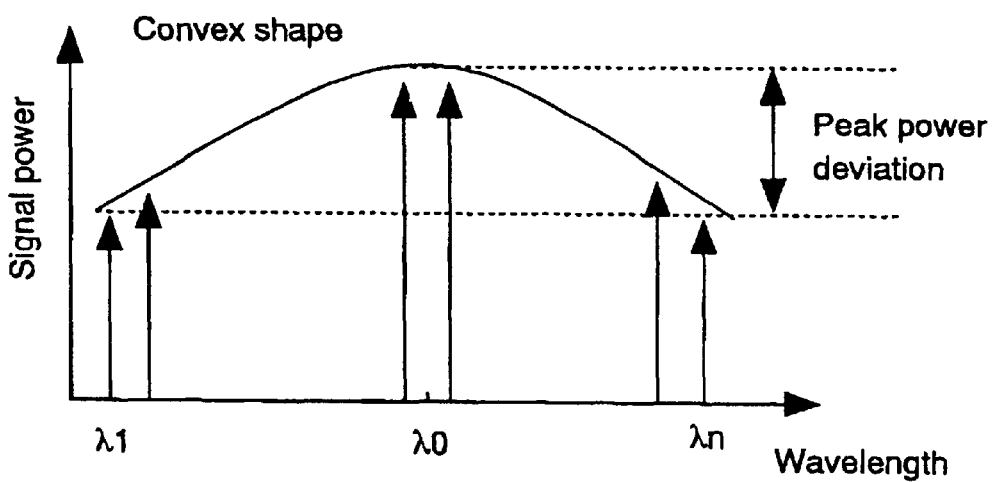
FIG. 3 is a diagram showing a power distribution of signal lights on an optical transmission line 12.
Figure 4:
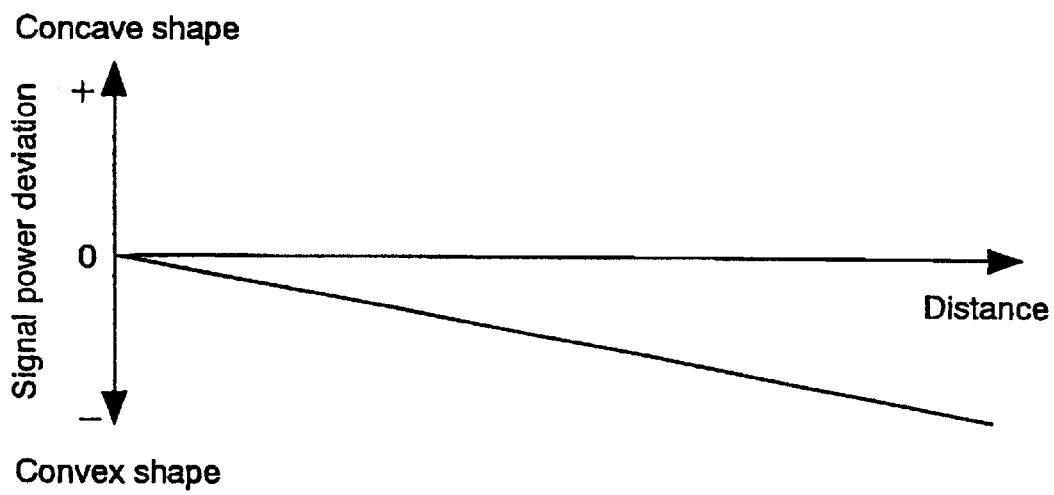
FIG. 4 is a diagram showing distance dependency of a power deviation.

When the optical amplification repeater 16 comprises the characteristic shown in FIG. 2, the power spectrum distribution of the signal lights describes a convex line showing the maximum value at the zero dispersion wavelength as shown in FIG. 3. In FIG. 3, the horizontal axis and the vertical axis represent wavelength and power of signal light respectively. The difference (to be described as power deviation, hereinafter) between the optical power of the signal wavelength nearest to the zero dispersion wavelength and that of the signal wavelength λ1 or λn on the end of the signal wavelength band increases directly proportional to the distance as shown in FIG. 4. In FIG. 4, the optical transmitter 10 is in the condition to output the signal light of wavelengths λ1~λn toward the optical transmission line 12 at the same optical intensity. The horizontal axis and the vertical axis represent distance and peak power deviation respectively. When the peak power deviation is minus, the power distribution of the signal lights becomes a convex shape and when it is plus, the distribution becomes a concave shape.

In the above-mentioned transmission system which is optically amplified or dispersion-compensated per band, the peak power deviation should be considered according to each band. When signal light of a plurality of wavelengths in a wavelength band longer than the zero dispersion wavelength λ0 is WDM-transmitted, the difference between the peak power of the shortest wavelength and that of the longest wavelength in the band becomes the power deviation. When accumulated chromatic dispersion of a plurality of bands is compensated in the center of each band, the difference between the power of the effective zero dispersion wavelength and that of the signal wavelength on the band end becomes the peak power deviation of each band.

As shown in FIG. 3, when each optical signal is transmitted in the convex-shaped power spectrum distribution, namely signal power of the optical signals having the wavelengths apart from the effective zero dispersion is reduced inversely proportional to the wavelength difference, the nonlinear effect gets reduced as shown in FIG. 3. The accumulated chromatic dispersion of a signal wavelength apart from the effective zero dispersion wavelength becomes larger than that of a signal wavelength near to the effective zero dispersion wavelength. However, the waveform distortion due to the accumulated chromatic dispersion can be restored by compensating for the dispersion at the optical transmitter 10 and/or the optical receiver 20. Consequently, it becomes possible to control the waveform deterioration caused by the synergistic effect of the nonlinear effect in the optical signals having the wavelengths apart from the effective zero dispersion wavelength and the accumulated chromatic dispersion. Accordingly, the transmission characteristics of the wavelengths apart from the effective zero dispersion wavelength is improved and each optical signal can obtain the equivalent transmission characteristic even at a high-speed transmission rate of 10 Gb/s or more.

When the peak powers of the wavelengths λ1 and λn on both ends is overly reduced, the S/N ratio of the signal light is deteriorated and, far from improving, the transmission characteristic becomes even worse. Accordingly, the absolute value of the power deviation preferably should be controlled under a specific value. From this point of view, the optical transmitter 10 can output each optical signal, at the beginning, at a concave-shaped power distribution in which the power of the signal light increases directly proportional to the wavelength difference from the zero dispersion wavelength. In this case, the power spectrum distribution of the signal lights flattens after a short transmission on the optical transmission line 12 and then changes to a convex shape. The convex shape becomes steeper according to the transmission distance of the signal light and the power deviation increases in the minus direction.

An alternative approach is that the signal light is output from the optical transmitter 10 in a convex-shape peak power distribution and its peak power deviation is maintained. On the optical transmission line 12, the peak power deviation can be gradually or intermittently increased in the minus direction according to the distance or also can be controlled within a specific range excluding zero as shown in FIG. 4.

In short, according to the present invention, the nonlinear effect of the signal wavelengths greatly influenced by the accumulated chromatic dispersion is reduced according to the amount of the accumulated chromatic dispersion. In this point of view, as explained referring to FIG. 4, it is most preferable to reduce the nonlinear effect according to the increase of the absolute value in the accumulated chromatic dispersion.

A 900 km periodic transmission test system is constructed and the transmission characteristic after 9000 km transmission, or the transmission characteristic after ten rounds, is measured. The periodic transmission test system comprises twenty-one 980 nm pumping optical amplifiers (one of them is for compensating the loss due to the periodic test), eighteen pairs of 45 km span dispersion shift fibers (the chromatic dispersion at 1550 nm is approximately −2 ps/km/nm) and two pairs of dispersion compensating fibers (the chromatic dispersion at 1550 nm is approximately 18 ps/km/nm).

The measuring conditions are as follows. The output power level of the optical amplifier is set to 9.5 dB. The dispersion compensating fibers are inserted at intervals of 450 km so that the effective zero dispersion wavelength of the periodic transmission system becomes 1550 nm. In regard to signal wavelengths, sixteen wavelengths of 1.6 nm wavelength intervals are multiplexed between 1545.5 nm and 1554.5 nm. The sixteen wavelengths are divided into two portions and the respective eight wavelengths are collectively RZ-modulated at 10.7 Gb/s of a $2^{23}-1$ stage data pattern length and phase-modulated at 10.7 Gb/s of a 0.8 π modulation factor. The pulse width of the RZ optical signal is set to approximately 40 ps and the phase modulation timing of a phase modulator is adjusted so that the frequency deviation becomes zero at the center of the optical pulse. A birefringent medium of PMD 10 ps is disposed after the phase modulator so that the polarization varies according to the optical phase. The accumulated chromatic dispersion of each optical signal is compensated on the optical transmitter/receiver side so that the residual chromatic dispersion becomes approximately 100 ps/nm in the longer wavelength side and −100 ps/nm in the shorter wavelength side.

Figure 5:
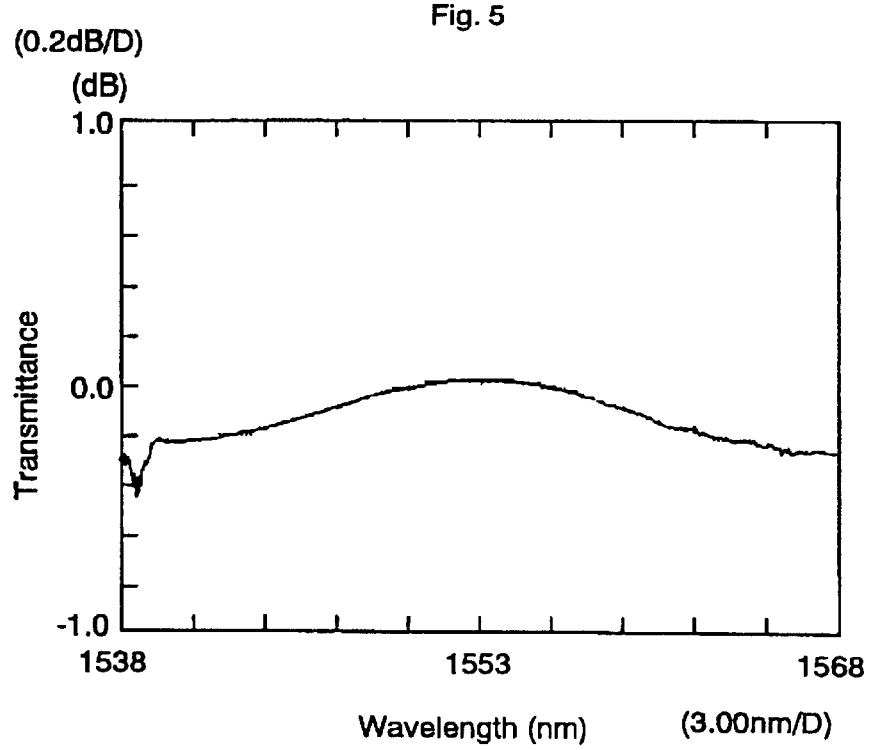
FIG. 5 is a diagram showing a transmission characteristic of a Fabry-Perot etalon optical filter for adjusting a gain distribution of an optical amplifier.

In each optical amplifier, a Fabry-Perot etalon filter, having a transmission characteristic shown in FIG. 5, is connected after an erbium doped optical amplification fiber and its gain characteristic is adjusted to form a convex shape indicating the maximum at the effective zero dispersion wavelength 1550 nm. In FIG. 5, the horizontal axis and the vertical axis represent the maximum transmissibility and the minimum transmissibility respectively. The FSR is 25 nm and the difference between the maximum and minimum transmissibility in the signal wavelength band is set to 0.25 dB. The maximum transmission wavelength of the Fabry-Perot filter is set to 1553 nm. Although the effective dispersion wavelength is explained as 1550 nm in the above, the gain of the erbium doped optical amplification fiber of the optical amplifier pumped by 980 nm laser light generally becomes the maximum at a wavelength slightly shorter than 1550 nm. Therefore, the maximum transmission wavelength of the Fabry-Perot filter is set to 1553 nm so that the gain characteristic of the optical amplifier as a whole becomes the maximum at 1550 nm and the gain characteristic is set so that the power deviation becomes 1 dB after the 900 km transmission.

Figure 6:
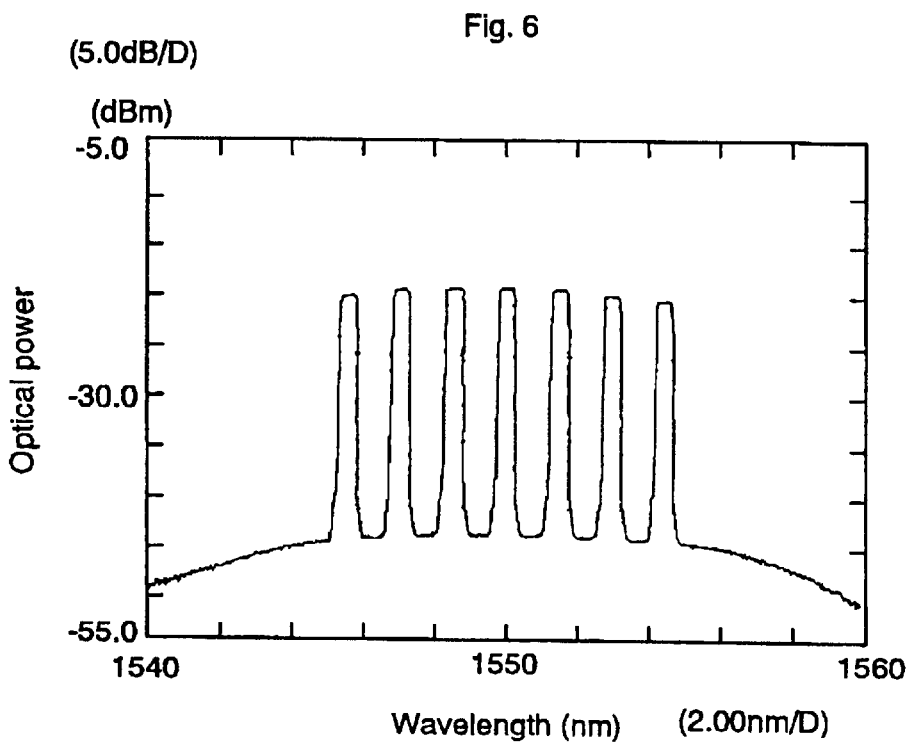
FIG. 6 is a diagram showing a signal level after a 900 km transmission.
Figure 7:
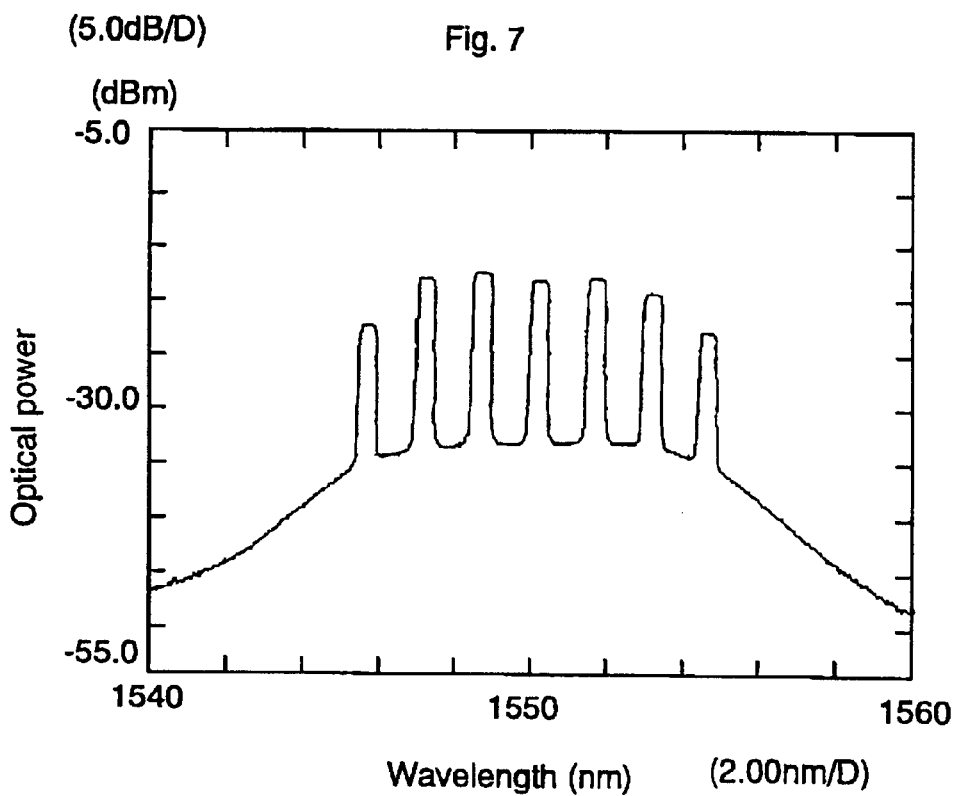
FIG. 7 is a diagram showing a signal level after a 9,000 km transmission.

FIGS. 6 and 7 show the signal levels after the 900 km transmission (namely, after one round transmission) and after the 9000 km transmission (namely, after ten rounds transmission) respectively. In FIGS. 6 and 7, the horizontal axis and the vertical axis represent wavelength and power level respectively. In this stage, seven wavelengths are multiplexed so that the level differences between the respective wavelengths can be compared. The power deviation shows 1 dB after the 900 km transmission and becomes approximately 4 dB after the 9000 km transmission. In the 9000 km transmission, the transmission characteristic is almost satisfactory with the peak power deviation of 1~8 dB and becomes the optimum at 4 dB. It is presumed that the power deviation can be larger when the transmission distance is shorter. Needless to say, the above numeric data of power deviation are subject to change with other conditions.

Figure 8:
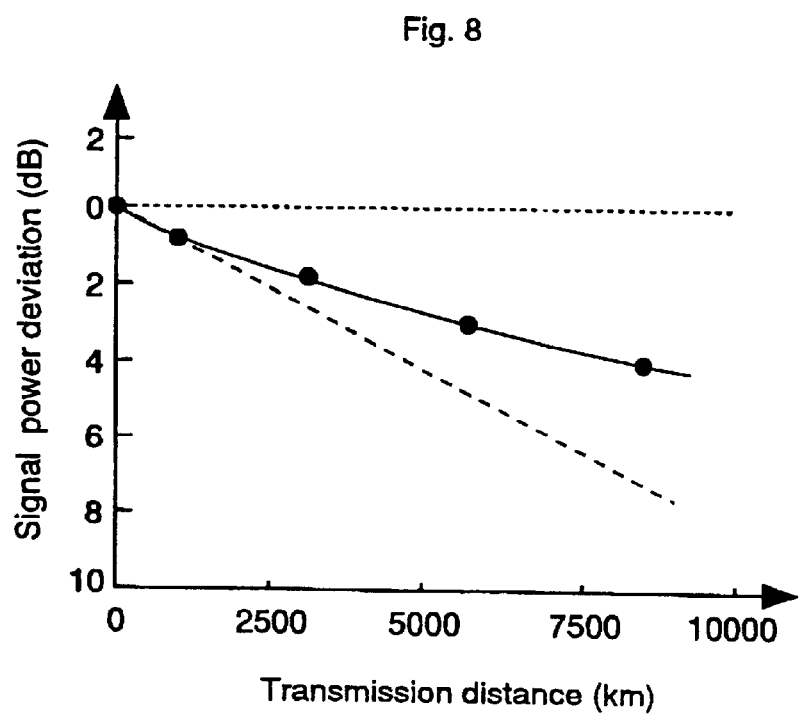
FIG. 8 is a diagram showing distance dependency of a peak power deviation.

FIG. 8 shows the distance dependency of the power deviation. The horizontal axis and the vertical axis represent transmission distance and power deviation respectively. The black circles represent the measured values of power deviation at each transmission distance. The broken line shows the distance dependency of the power deviations analogized (extrapolated) from the gain characteristic of one optical amplifier. The solid line shows the distance dependency of the peak power deviations obtained from the actual measurement. The actual power deviation is smaller than the analogized value and does not cause the severe S/N ratio deterioration after the long-haul transmission even with the convex-shaped gain characteristic. Referring to the above results, transmission characteristics are measured in the condition that the power deviation after the 900 km transmission is set to 1 dB so that the power deviation after the 9000 km transmission becomes 4 dB. If the power deviation becomes excessively large, the S/N ratios of the surrounding signal wavelengths are overly deteriorated causing deterioration of the transmission characteristic.

Figure 9:
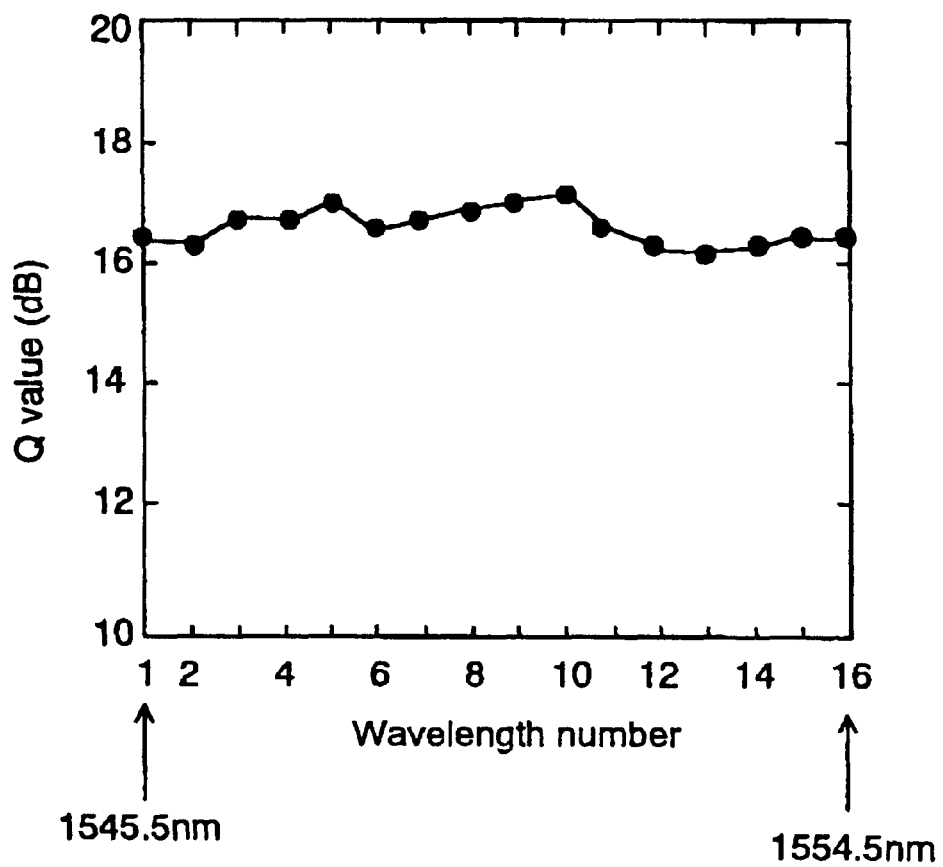
FIG. 9 is a diagram showing transmission characteristics of 16 multiplexed wavelengths after a 9,000 km transmission.

FIG. 9 shows the transmission characteristic of each wavelength when sixteen wavelengths are multiplexed and transmitted for 9000 km. The horizontal axis represents wavelengths and they are numbered in order from the shortest wavelength (1545.5 nm). The wavelength interval is 1.6 nm. The vertical axis represents Q value. As obvious from FIG. 9, even the transmission characteristics of the shorter and longer wavelengths with large accumulated chromatic dispersion do not indicate any deterioration. All the wavelengths are obtained the Q values of 16 dB or more and thus the satisfactory transmission characteristics.

In the embodiment shown in FIG. 1, the power distribution of the signal lights is adjusted at each optical amplifier, however, it is also possible to adjust it at longer intervals.

Figure 10:
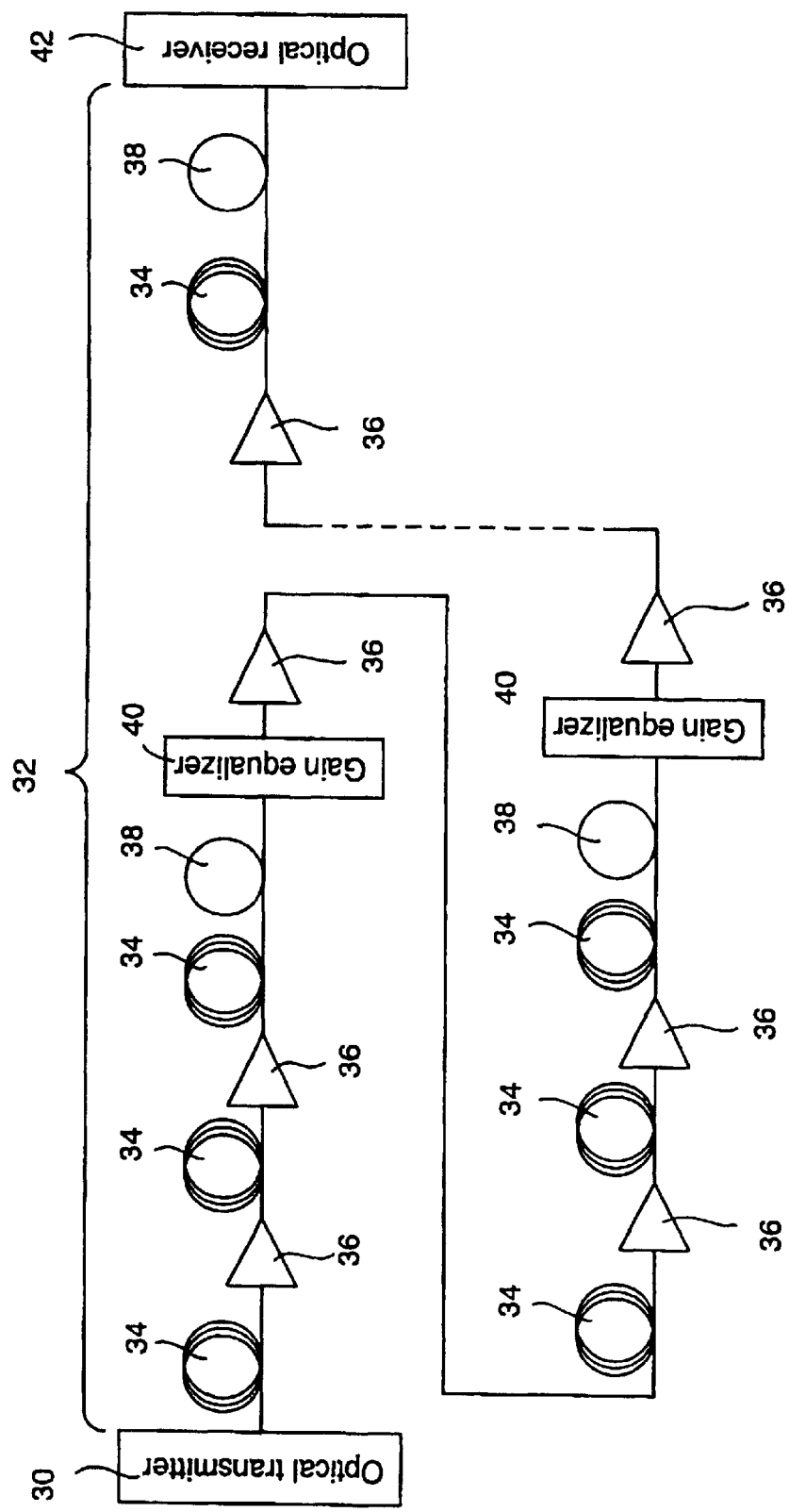
FIG. 10 is a schematic block diagram according to the second embodiment of the present invention.

FIG. 10 is a schematic block diagram of an embodiment in which gain equalizers are disposed at intervals of 450 km. An optical transmitter 30 outputs WDM signal light, obtained by multiplexing the signal light having a plurality of wavelengths (e.g. twenty-one wavelengths), toward an optical transmission line 32. The optical transmission fiber 34 comprises a dispersion compensating amplification repeater transmission line having an optical transmission fiber 34, an optical repeater amplifier 36, a dispersion compensating fiber 38 and a gain equalizer 40. The optical transmission fiber 34 is for instance 45 km in length, the optical repeating amplifiers 36 are disposed at intervals of 45 km, the dispersion compensating fibers 38 are disposed at intervals of 450 km and the gain equalizers 40 are disposed at intervals of 450 km. The signal light from the optical transmitter 30 is optically amplified by the optical repeating amplifiers 36, compensated its accumulated chromatic dispersion by the dispersion compensating fibers 38 and adjusted its power distribution to the predetermined convex shape by the gain equalizers 40 while it is propagating on the optical transmission fiber 34. The signal light propagated on the optical transmission line 32 arrives an optical receiver 42 to get a receiving process.

Figure 11:
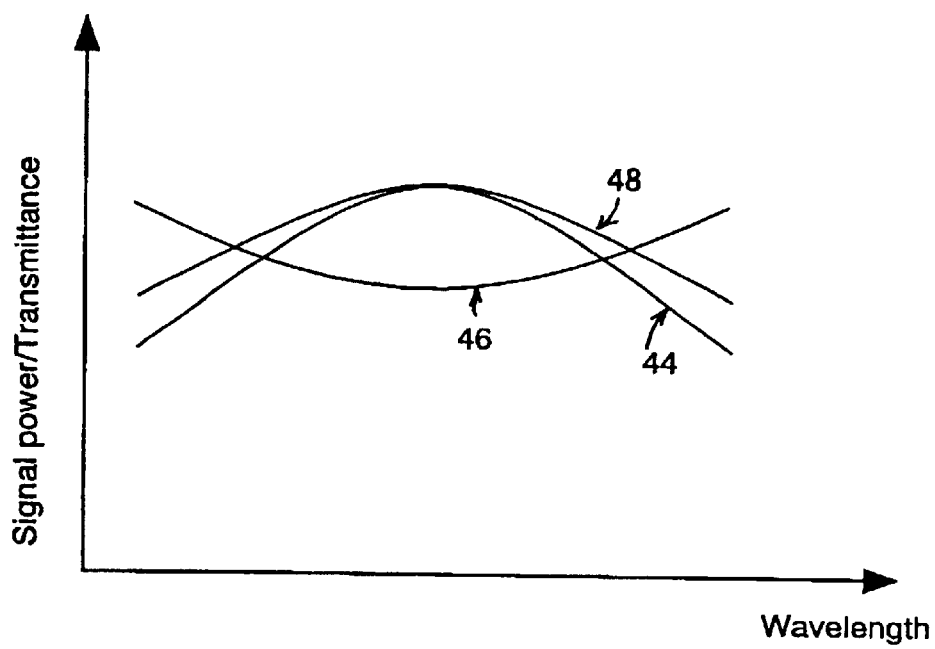
FIG. 11 is a diagram showing an equalization characteristic of a gain equalizer 40 and peak power distributions of signal lights before and after transmission of the gain equalizer 40.

FIG. 11 shows the equalizing characteristics of the gain equalizer 40 and the power distributions before and after the equalizer 40. The horizontal axis represents wavelength and the vertical axis represents power or transmissibility. Numeral 44 denotes the power distribution of the signal lights after a 450 km transmission, 46 denotes the transmissibility of the gain equalizer 40, and 48 denotes the power distribution after the transmission through the gain equalizer 40 as well as the 450 km transmission line.

The optical repeater amplifier 36, different from the optical amplification repeater 16, is not capable of amplifying the signal light having the wavelengths apart from the effective zero dispersion wavelength until the desired peak power. Such optical repeating amplifiers are generally used and easy to obtain. As known from the characteristic 44, the powers of the signal light apart from the effective dispersion wavelength are too low. In order to compensate for such gain characteristic of the optical repeater amplifier 36, the transmission characteristic of the gain equalizer 40 is changed to a concave shape shown as the characteristic 46. Accordingly, after the transmission of the gain equalizer 40, the powers of the signal light apart from the effective zero dispersion wavelength can be increased to the appropriate levels compared to those of the signal light equal or near to the effective zero dispersion wavelength. That is, the excessively large power deviations are reduced into the appropriate range by the gain equalizer 40.

Figure 12:
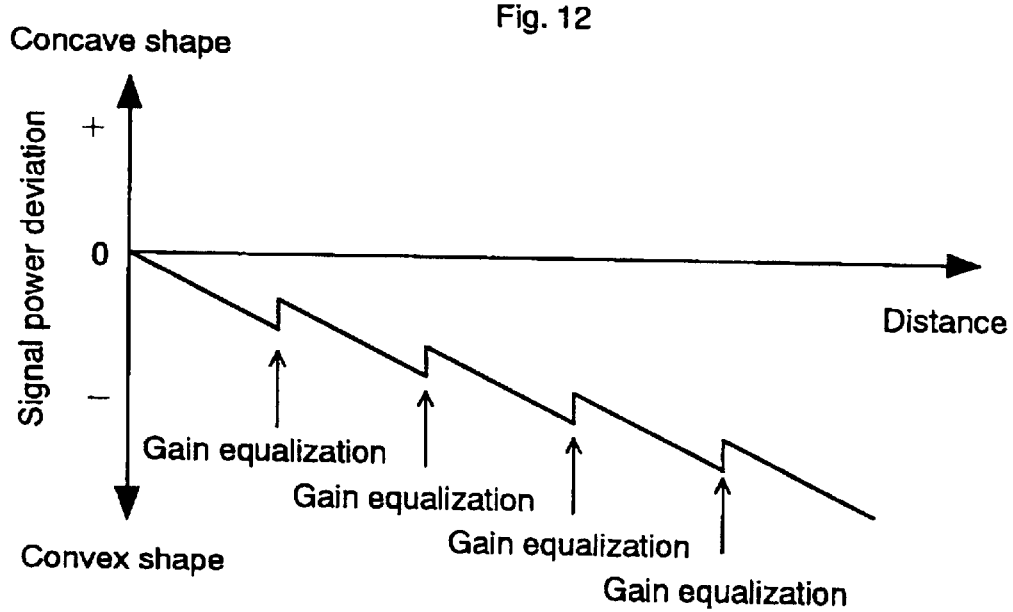
FIG. 12 is a diagram showing distance dependency of a peak power deviation according to the embodiment shown in FIG. 10.

FIG. 12 shows the distance dependency of the peak power deviation in the embodiment shown in FIG. 10. The horizontal and vertical axis represents distance and peak power deviation respectively. The peak power deviation increased in the optical repeater amplifier 36 is reduced by the gain equalizer 40.

It is obvious that the transmission characteristic of the gain equalizer 40 is determined by the difference between the gain characteristics of the optical repeater amplifier 36 and the desired power deviation. Namely, the transmission characteristic of the gain equalizer is not limited to a concave-shaped characteristic shown as the numerous 46 in FIG. 11.

Figure 13:
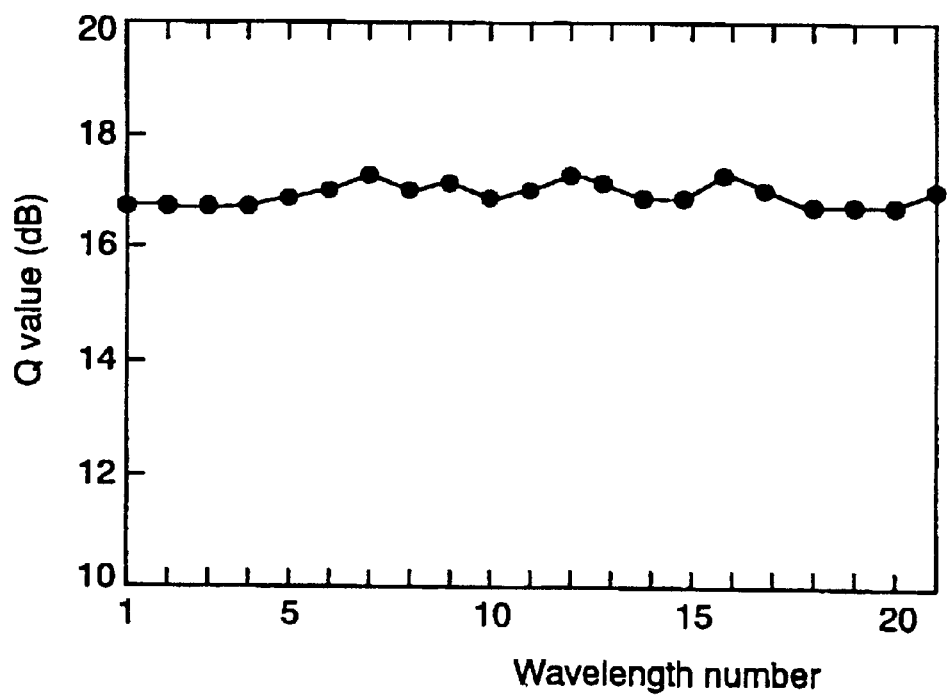
FIG. 13 is a diagram showing the experimental transmission result according to the embodiment shown in FIG. 10.

Transmission characteristics are actually measured after the twenty-one 10 Gb/s WDM wavelengths transmission over 7000 km using a periodic experimental system. FIG. 13 shows the results. The transmission characteristic of the gain equalizer 40 is set so that the power deviation becomes approximately 4 dB after the 7000 km transmission. The Q value of approximately 17 dB is realized in all the wavelengths. With the result, it is confirmed that the present invention is greatly effective as a method for improving the transmission characteristics.

The above embodiment is an ideal type and in practical optical transmission systems gain shapes are sometimes deviated from the desired shape even after the operation as well as the beginning of the operation due to the various reasons such as the manufacturing errors of optical filters and gain equalizers and the change of cable loss owing to the aged deterioration of optical fiber cables. Such shift of the gain shape can be removed or relieved by introducing control light having a wavelength apart from the signal wavelength band to the optical transmission line 12. Since this control light is used for controlling the gain shape of the optical transmission line 12, it is called gain-shape control light hereinafter.

Figure 14:
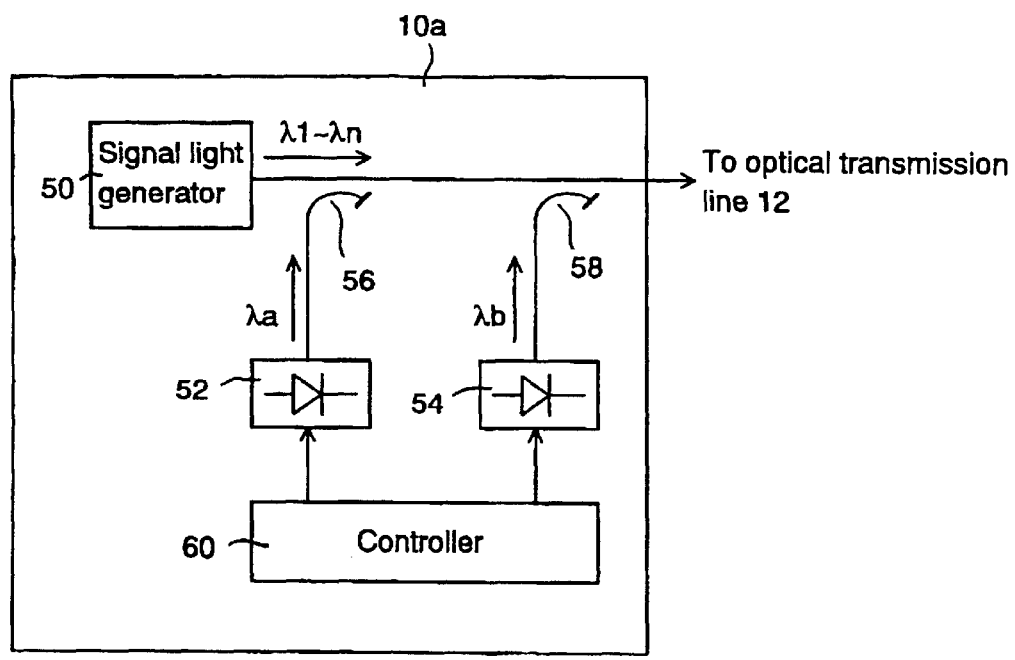
FIG. 14 is a schematic block diagram according to a modified embodiment of an optical transmitter.

FIG. 14 is a schematic block diagram of an optical transmitter 10a modified for generating the gain-shape control light. Numeral 50 denotes a signal light generator for generating WDM signal light obtained by multiplexing optical signals having wavelengths from $\lambda 1$ to $\lambda n$; numeral 52 denotes a laser light source for generating CW gain-shape control light having a wavelength $\lambda a$ which is shorter than the wavelength $\lambda 1$; numeral 54 denotes a laser light source for generating CW gain-shape control light having a wavelength $\lambda b$ which is longer than the wavelength $\lambda n$; numerals 56 and 58 denote WDM couplers for multiplexing the output light from the laser light sources 52, 54 and the output light from the signal light generator 50 respectively; and numeral 60 denotes a control circuit for controlling the intensity of the light from the laser optical sources 52 and 54 as well as controlling whether those laser optical sources output the light or not. Preferably, the laser light sources 52 and 54 can change the oscillation wavelengths freely.

Figure 15:
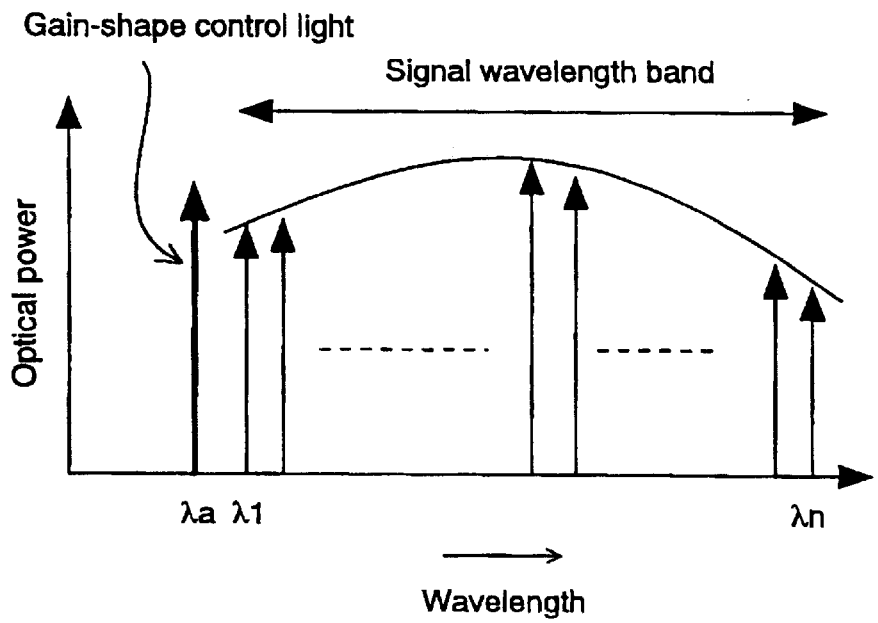
FIG. 15 is a diagram showing a spectral distribution of signal lights propagating on an optical transmission line 12 for lowering a power which is risen excessively on a shorter wavelength side.

Explained below, for example, is the case that the peak power on the shorter wavelength side becomes too high on the optical transmission line 12,. In this case, the control circuit 60 outputs the gain-shape control light (of wavelength $\lambda a$) from the laser optical source 52. The gain-shape control light (of the wavelength $\lambda a$) from the laser light source 52 is multiplexed by the WDM coupler 56 with the WDM signal light from the signal light generator 50 and output together toward the optical transmission line 12. FIG. 15 shows a spectral distribution of the signal lights propagating on the optical transmission line 12. The horizontal and vertical axis represents waveform and optical intensity respectively. The power distribution of the signal lights is in the condition that the control light is not applied yet. Besides the signal wavelengths $\lambda 1 \sim \lambda n$, the gain-shape control light of the wavelength $\lambda a$ being shorter than the wavelength $\lambda 1$ enters the optical repeater amplifier 16 on the optical transmission line 12. Within the area of several nm which surrounds the gain-shape control light (of the wavelength $\lambda a$) in the optical repeater amplifier 16, the signal gain decreases due to the spectral hole burning effect. The depression of the signal gain reduction becomes deeper as the intensity of the gain-shape control light increases. Accordingly, the excessively high power on the shorter wavelength side is reduced. The control circuit 60 adjusts the output light level and/or the oscillation wavelength $\lambda a$ of the laser light source 52 so that the power of the signal light on the short wavelength side reduces to the desired level. By adjusting the oscillation wavelength $\lambda a$, the signal wavelength which gain is desired to adjust can be selected.

Figure 16:
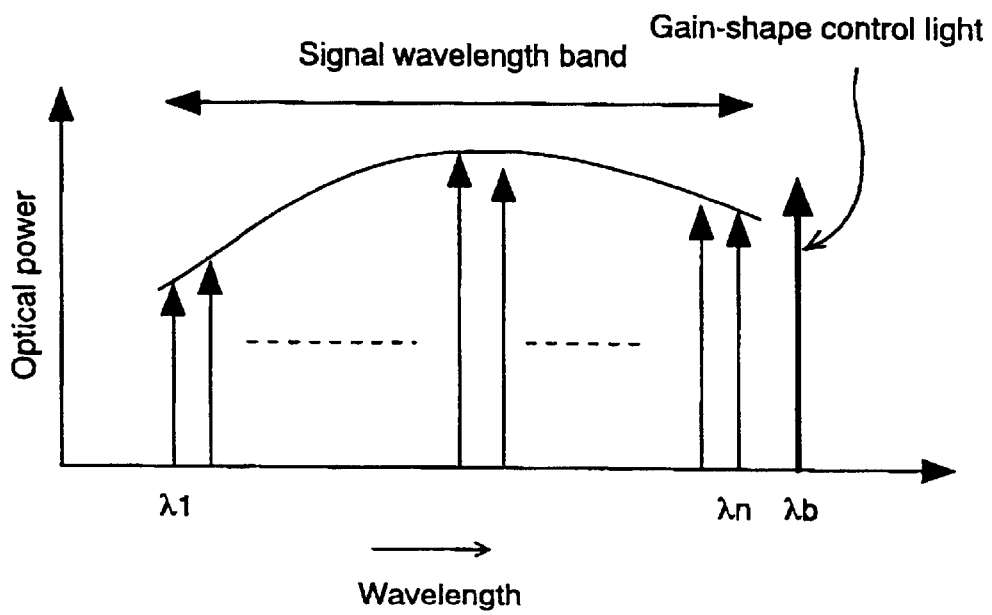
FIG. 16 is a diagram showing a spectral distribution of signal lights propagating on the optical transmission line 12 for lowering a power which is risen excessively on a longer wavelength side.

When the power on the longer wavelength side becomes too high on the optical transmission line 12, the control circuit 60 outputs the gain-shape control light (of wavelength $\lambda b$) from the laser light source 54. The gain shape control light (of, the wavelength $\lambda b$) is multiplexed by the WDM coupler 58 with the WDM signal light from the signal light generator 50 and output together toward the optical transmission line 12. FIG. 16 shows the spectral distribution of the signal lights propagating on the optical transmission line 12. The horizontal and vertical axis represents waveform and optical intensity respectively. The power distribution of the signal lights is in the condition before the application of the control light. Besides the signal wavelengths $\lambda 1 \sim \lambda n$, the gain-shape control light of the wavelength $\lambda b$ being longer than the wavelength $\lambda n$ enters the optical repeating amplifier 16 on the optical transmission line 12. Within the area of several nm which surrounds the gain-shape control light (of the wavelength $\lambda b$) in the optical repeater amplifier 16, the signal gain decreases due to the spectral hole burning effect. The depression of the signal gain reduction becomes deeper as the intensity of the gain shape control light increases. Accordingly, the excessively high power on the longer wavelength side is reduced. The control circuit 60 adjusts the output light level and/or the oscillation wavelength $\lambda b$ of the laser light source 54 so that the power of the signal light on the longer wavelength side reduces to the desired level. By adjusting the oscillation wavelength $\lambda b$, the signal wavelength which gain is desired to adjust can be selected.

Figure 17:
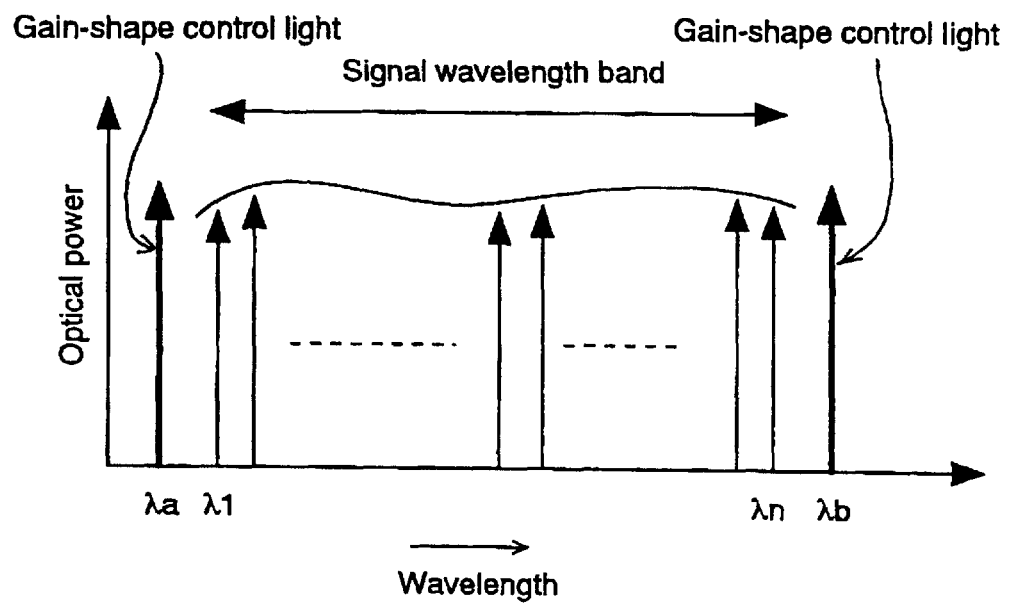
FIG. 17 is a diagram showing a spectral distribution of signal lights propagating on the optical transmission line 12 for lowering powers on both shorter and longer wavelength sides.

When the powers on both shorter and longer wavelength sides become too high on the optical transmission line 12, the control circuit 60 outputs the gain-shape control light of the wavelengths $\lambda a$ and $\lambda b$ from both laser light sources 52 and 54 respectively. The gain-shape control light from the laser light sources 52 and 54 is multiplexed by the WDM couplers 56, 58 with the WDM signal light from the signal light generator 50 and output together toward the optical transmission line 12. FIG. 17 shows a spectral distribution of the signal lights propagating on the optical transmission line 12. The horizontal and vertical axis represents waveform and optical intensity respectively. The power distribution of the signal lights is in the condition before the application of the control light. Besides the signal wavelengths $\lambda 1 \sim \lambda n$, the gain-shape control light of the wavelength $\lambda a$ being shorter than the wavelength $\lambda 1$ and the wavelength $\lambda b$ being longer than the wavelength $\lambda n$ enters the optical repeater amplifier 16 on the optical transmission line 12. In the optical repeater amplifier 16, the signal gain on both ends of the shorter and longer wavelength side decreases due to the spectral hole burning effect. Accordingly, the excessively high powers are reduced on both shorter and longer wavelength sides. The control circuit 60 adjusts the output light level and/or the oscillation wavelengths $\lambda a$ and $\lambda b$ of the laser light sources 52 and 54 so that the powers of the signal light on both shorter and longer wavelength sides are reduced to the desired level.

The laser light sources 52 and 54 can comprise either a single laser diode or a plurality of laser diodes having different oscillation wavelengths. When the gain-shape control light having the plurality of wavelengths being different one another is utilized, the power distribution of the signal lights is controlled more closely.

The gain-shape control light from the laser light sources 52 and 54 comprises preferably CW light, however intensity-modulated light is also applicable. The intensity modulation is used for controlling or monitoring the optical repeating amplifier 16. To obtain stronger intensity-modulated light for gain controlling, the power should be increased and the modulation degrees should be reduced. When it is sufficient with the weak gain-shape control light, the intensity modulation degree should be set high. Accordingly, the bad influence on the signal light is reduced.

Figure 18:
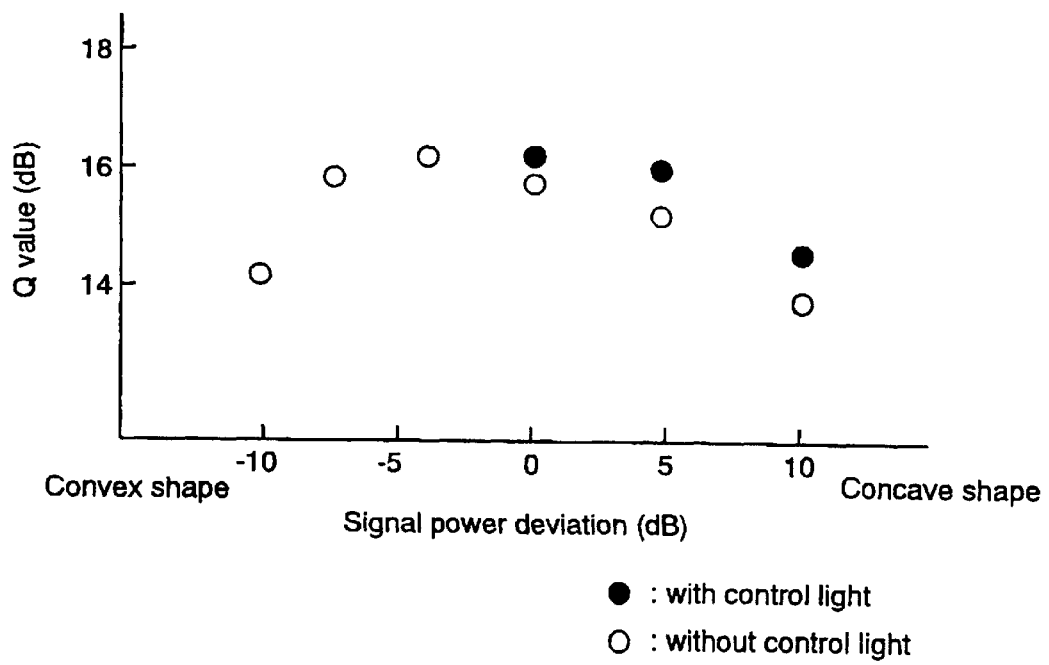
FIG. 18 is a diagram showing experimental results for confirming the effect of a gain shape control light.
Figure 19:
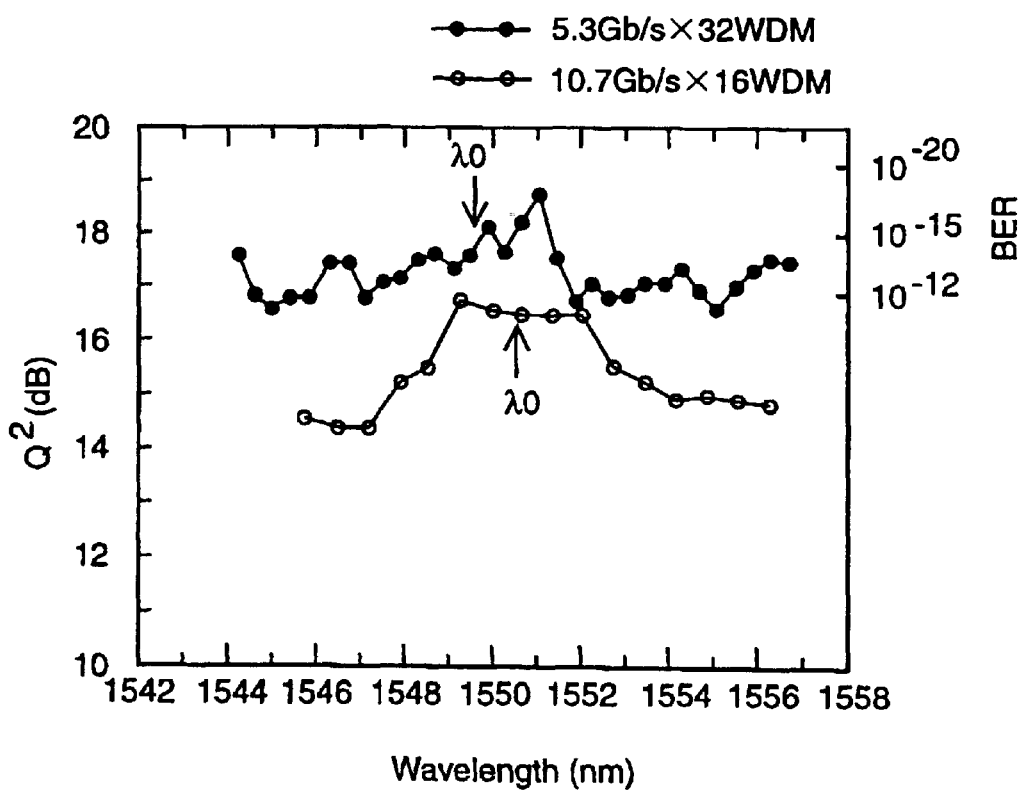
FIG. 19 is a diagram showing experimental results of large-capacity and long distant optical transmission according to a conventional configuration.

The effect of the gain-shape control light is confirmed in practice by intentionally changing the gain distribution of the optical repeater amplifier 16. How the transmission characteristics of the shortest wavelength (CH1) and the longest wavelength (CH16) depend on the peak power was examined after a transmission of sixteen 10.7 Gb/s multiplexed wavelengths over 9000 km. The results are shown in FIG. 18. The horizontal axis represents power deviation in the condition that the control light is not applied to the optical transmission line, and the vertical axis represents Q value (dB). In FIG. 18, the power deviation represented as the horizontal axis reflects the intrinsic characteristic of the transmission line. That is, the minus power deviation shows that the power distribution of the signal lights becomes a concave shape as the intrinsic characteristic of the transmission line, and the plus power deviation shows that the power distribution of the signal lights becomes a convex shape as the intrinsic characteristics of transmission line.

The white circles represent the average Q values of the longest and shortest wavelength in the sixteen wavelengths having large accumulative dispersion after the 9000 km transmission. The black circles represent the transmission characteristics in the case that gain-shape control light having one wavelength is added to outer side of each shortest and longest wavelength. Without the gain shape control light, the best transmission characteristic is obtained at the power deviation of −4 dB. On the other hand, when the control light is applied, the transmission characteristic mostly equal to the best condition is obtained even at the power deviation of +5 dB. This is because the concave-shaped gain characteristic inherent in the optical transmission line is flattened or convex-shaped due to the spectral hole burning effect of the optical amplifier caused by the gain-shape control signal and as a result the transmission characteristics are improved.

As readily understandable from the foregoing description, according to the invention, in a high-speed WDM transmission system, a great number of wavelengths, even wavelengths at the ends of a signal wavelength band, can obtain the satisfactory transmission characteristic. Consequently, a large-capacity and long-haul optical transmission system of 10000 km or more can be realized.

While the invention has been described with reference to the specific embodiment, it will be apparent to those skilled in the art that various changes and modifications can be made to the specific embodiment without departing from the spirit and scope of the invention as defined in the claims.

What is claimed is:

1. A WDM optical transmission system comprising:
   an optical transmission line having an effective zero dispersion wavelength;
   an optical transmitter for wave-length-division-multiplexing and outputting toward the optical transmission line a plurality of input signal lights, each input signal light of the plurality of input signal lights having a different signal wavelength; and
   an optical receiver for receiving the input signal lights having propagated on the optical transmission line,
   wherein, in the optical transmission line, each input signal light of the plurality of input signal lights has a peak power lower than a peak power of a signal light having a wavelength equal to the effective zero dispersion wavelength of the optical transmission line and the peak power of a respective signal light of the plurality of input signal lights becomes lower as the signal wavelength of the respective signal light becomes further apart from the effective zero dispersion wavelength of the optical transmission line.

2. The WDM optical transmission system of claim 1 wherein the optical transmission line comprises transmission characteristics in which the transmissibility of the optical transmission line becomes lower as the signal wavelength becomes further apart from the effective zero dispersion wavelength of the optical transmission line.

3. The WDM optical transmission system of claim 1 wherein the power deviation between the input signal light of the minimum transmission loss and the input signal light of the maximum transmission loss is within a predetermined value.

4. The WDM optical transmission system of claim 3 wherein the predetermined value is 8 dB.

5. The WDM optical transmission system of claim 2 wherein the optical transmission line comprises at least one optical amplifier having gain characteristics in which the gain becomes lower as the signal wavelength becomes further apart from the effective zero dispersion wavelength of the optical transmission line.

6. The WDM optical transmission system of claim 5 wherein the at least one optical amplifier comprises a plurality of optical amplifiers disposed on the optical transmission line at specific intervals.

7. The WDM optical transmission system of claim 2 wherein the optical transmission line comprises a transmission characteristics adjuster which transmissibility is lower as the wavelength is apart from the effective zero dispersion wavelength of the optical transmission line.

8. The WDM optical transmission system of claim 7 further comprising a plurality of transmission characteristics adjusters disposed on the optical transmission line at specific intervals, the plurality of transmission characteristics adjusters including the transmission characteristics adjuster.

9. The WDM optical transmission system of claim 1 wherein the optical transmitter outputs a plurality of optical signals toward the optical transmission line in a convex-shaped power distribution in which the power of the output signal light lowers as the wavelength of the signal light becomes further apart from the effective zero dispersion wavelength of the optical transmission line.

10. The WDM optical transmission system of claim 1 wherein the optical transmitter outputs a plurality of optical signals toward the optical transmission line in a concave-shaped power distribution in which the power of a respective output signal light becomes higher as the wavelength of the respective output signal light becomes further apart from the effective zero dispersion wavelength of the optical transmission line, then the power spectrum distribution of the signal lights changes on the optical transmission line from the concave-shaped to a convex shaped in which the power of the respective output signal light becomes lower as the wavelength of the respective output signal light becomes further apart from the effective zero dispersion wavelength of the optical transmission line, wherein the output signal lights propagate in the convex-shaped power spectrum distribution for a distance on the optical transmission line greater than that of the concave-shaped power spectrum distribution.

11. The WDM optical transmission system of claim 1 wherein the optical transmitter comprises a control light generator for generating gain-shape control light having a wavelength outside the wavelength band of the signal light, and the gain-shape control light is selectively multiplexed with the input signal lights and output toward the optical transmission line.

12. The WDM optical transmission system of claim 11 wherein at least one of the optical power and the wavelength of the gain-shape control light is variable.

13. The WDM optical transmission system of claim 11 wherein the gain-shape control light comprises CW light.

* * * * *